US009332501B2

(12) United States Patent
Jakab et al.

(10) Patent No.: US 9,332,501 B2
(45) Date of Patent: May 3, 2016

(54) SYSTEM AND METHOD FOR ANTENNA-RECEIVER COMMUNICATION

(71) Applicant: Hemisphere GNSS Inc., Scottsdale, AZ (US)

(72) Inventors: Andy Jakab, Alberta (CA); Walter J. Feller, Airdrie (CA); Ryan Wen Xiaoping, Calgary (CA)

(73) Assignee: HEMISPHERE GNSS INC., Scottsdale, AZ (US)

( * ) Notice: Subject to any disclaimer, the term of this patent is extended or adjusted under 35 U.S.C. 154(b) by 0 days.

(21) Appl. No.: 14/517,321

(22) Filed: Oct. 17, 2014

(65) Prior Publication Data

US 2015/0201380 A1 Jul. 16, 2015

Related U.S. Application Data

(60) Provisional application No. 61/927,709, filed on Jan. 15, 2014.

(51) Int. Cl.
*H04W 52/00* (2009.01)
*H04W 52/04* (2009.01)
*H04W 52/36* (2009.01)

(52) U.S. Cl.
CPC ............ *H04W 52/04* (2013.01); *H04W 52/367* (2013.01)

(58) Field of Classification Search
CPC .............................. H04W 52/04; H01Q 21/00
USPC ......... 455/522, 69, 562.1, 67.11, 66.1, 67.16, 455/276.1; 370/354
See application file for complete search history.

(56) References Cited

U.S. PATENT DOCUMENTS

| 6,763,226 B1* | 7/2004 | McZeal, Jr. ........ H04B 7/18595 |
| | | 370/354 |
| 8,948,235 B2* | 2/2015 | Negus .................... H04B 15/00 |
| | | 370/210 |
| 2006/0220876 A1* | 10/2006 | Campero ............. G06K 7/0008 |
| | | 340/572.7 |
| 2006/0261927 A1 | 11/2006 | Kelly et al. |
| 2011/0121945 A1 | 5/2011 | Murdoch et al. |

(Continued)

OTHER PUBLICATIONS

Patent Cooperation Treaty, International Search Report and the Written Opinion of the International Search Authority, or the Declaration for PCT/US2015/011157, May 1, 2015, USA.

*Primary Examiner* — John J Lee
(74) *Attorney, Agent, or Firm* — Schmeiser, Olsen & Watts LLP

(57) ABSTRACT

An antenna-receiver communication system comprises an antenna conductor, antenna, and intelligent antenna controller. The intelligent antenna controller and antenna are connected via a conductor for providing power to the antenna from the intelligent antenna controller, and a received signal from the antenna to the intelligent antenna controller. The intelligent antenna controller is configured to provide voltage to the antenna for its operation, and to systematically alter the provided voltage level to communicate information to the antenna. The antenna is configured to communicate messages to the intelligent antenna controller by systematically altering the current consumed by the antenna. Both the intelligent antenna controller and antenna are configured to decode received messages and act on them. A method for communication between an intelligent antenna controller and antenna utilizing patterns of voltage and current fluctuation over the conductor providing power from the intelligent antenna controller to the antenna is also provided.

20 Claims, 4 Drawing Sheets

(56) References Cited

U.S. PATENT DOCUMENTS

| | | | |
|---|---|---|---|
| 2013/0273974 A1* | 10/2013 | Lea | H01Q 21/24 455/562.1 |
| 2013/0290427 A1 | 10/2013 | Proud | |
| 2015/0061946 A1* | 3/2015 | Martinez-Ortigosa | H01Q 9/0407 343/713 |

* cited by examiner

SYSTEM AND METHOD FOR ANTENNA-RECEIVER COMMUNICATION

TECHNICAL FIELD OF THE INVENTION

The present invention relates generally to communication between antennas and antenna controllers and power supplies. More specifically, the present invention relates to systems and methods for efficiently and cost-effectively powering, controlling and communicating with antennas existing antenna signal transmission lines.

BACKGROUND OF THE INVENTION

Antennas are widely used in various communication and communication-related applications such as, for example, radio, television, telecommunications, computer, handheld, short-wave, microwave, navigation, radar and sonar applications. Such antennas may be used to detect a transmitted signal and provide the signal to various types of receivers depending on the nature of the signal detected. Such antennas may include signal processing circuitry configured to assist the antenna in the detection and/or filtering of the transmitted signals. Antennas having signal processing circuitry may utilize power provided from an external source to the antenna to power the signal processing circuitry, and may utilize control signals provided by a dedicated communication bus to control various aspects of the antenna operation.

BRIEF DESCRIPTION OF THE DRAWINGS

A more complete understanding of the present invention may be derived by referring to the detailed description and claims when considered in connection with the Figures (not necessarily drawn to scale), wherein like reference numbers refer to similar items throughout the Figures, and:

DETAILED DESCRIPTION

Figure 1:
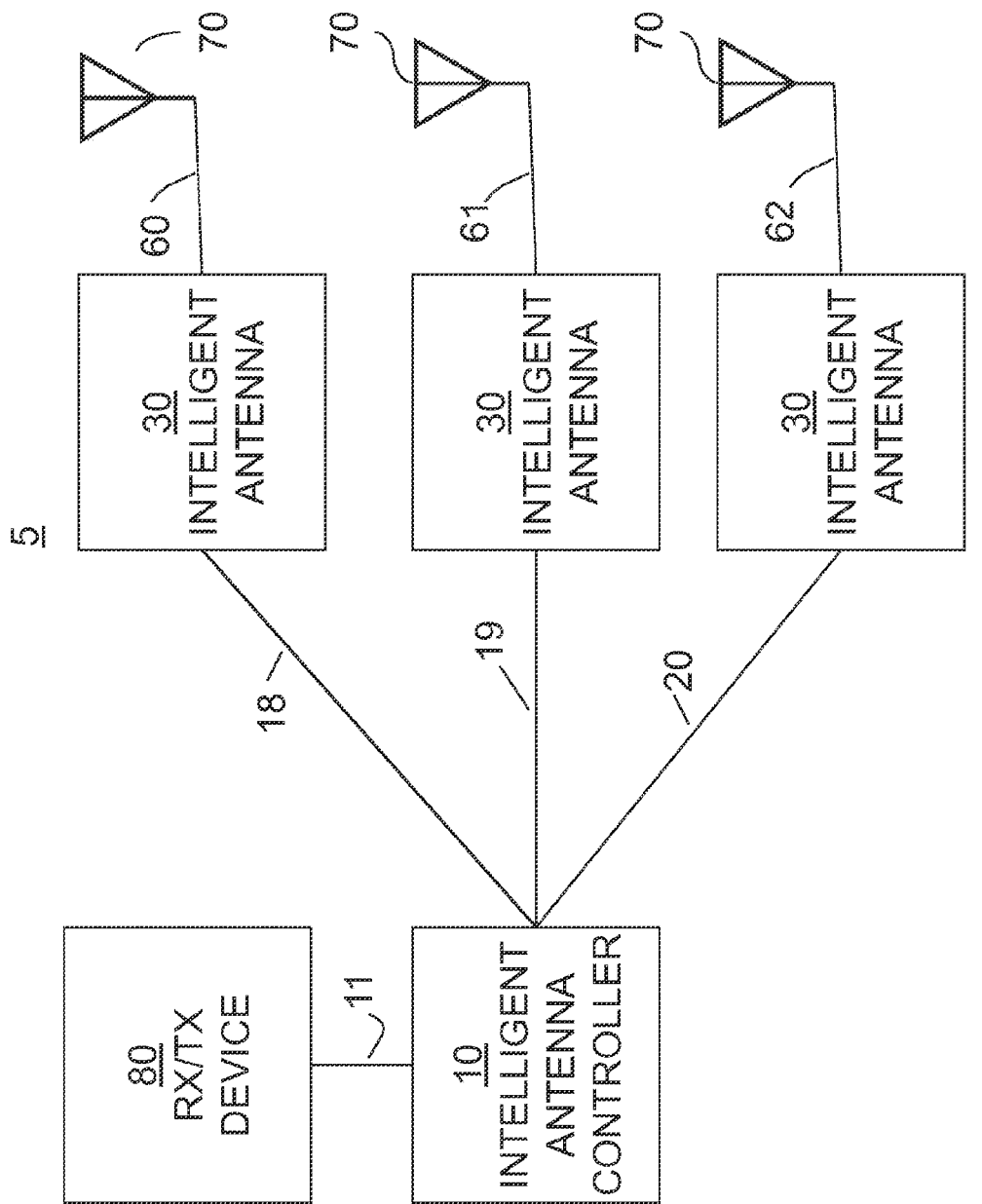
FIG. 1 shows a block diagram of an Intelligent Antenna System configured in accordance with the teaching of an embodiment.

Communication between physically connected electronic devices has typically involved the use of dedicated communication wires for the transfer of information. These communication lines may be grouped together and called a "communication bus". Such a communication bus refers to a group of wires that are used to pass information between the connected devices. These lines are often isolated or separated from other systems within the device in order to avoid conflicting communications methods or interference between sub-systems in the device. Dedicated communication buses are often employed in multiplicity within a system to use concurrent and/or different communication methods or protocols within the device. Communication may be in one direction at a time (simplex communication), or in both directions at the same time (duplex communication). Communication device complexity and transmission protocol may be influenced by the manner of communication (simplex or duplex). Typically, more complex and costly systems are required when duplex communication is involved.

Receiving antennas, especially RF antennas, may often be located with a clear view of the transmitter in order to best receive the incoming signal in the receiving antenna without interference due to obstructions or blockages, and to minimize attenuation of the received signal. The antenna may collect the RF signal from the transmitter through the air and pass the signal, typically via a coaxial RF cable, to the receiver for processing. The receiver then decodes the RF signal from the antenna and makes use of it for the intended application.

In some cases where a receiving device is connected to an antenna, there is no need for there to be inter-device communications between the receiver and antenna—the receiver simply receives the signal, such an RF signal, via the antenna, and processes the signal. A need for inter-device communication may arise when an antenna employs additional logic within its design, such that its operations require feedback from the receiver in order to specify its mode of operation, or where such feedback would be beneficial for improved performance of the antenna or the receiver-antenna pair. This additional processing within the antenna may include, for example, digital filter block switching, antenna signal pre-processing, or antenna signal decoding for the purposes of improving the quality of the signal before it is provided to the receiver. This additional processing may provide for, for example, interference rejection or noise cancellation.

Typically, communication with an antenna has been via an isolated communications bus that is separate from the main antenna signal line (radio frequency line, in the case of an RF antenna) of the antenna connected to the receiver. Using a separate communications bus requires additional cabling and wires connecting the antenna to the receiver. Often, these additional communications cablings can be cumbersome and expensive, and can complicate installation of the system. In a typical system involving an RF antenna and receiver (with a standard coaxial RF cable connecting the receiver and antenna), a receiver may provide a fixed, current limited, voltage to the antenna from which the antenna may draw its power to operate. In this case, the antenna and receiver are not located on the same circuit board, but are connected via a cable. The cable serves the purpose of carrying the RF signal from the antenna to the receiver for processing, while at the same time providing power to the antenna for it to operate.

Attempts have been made to facilitate communication between a receiver and antenna on a single RF line by using an RF sub-carrier frequency and modulating data onto it for communications. In this case, the RF sub-carrier describes the modulated RF signal such that it is sufficiently far away, in frequency, from the main antenna signal frequency of interest passed along the RF cable, to avoid interference. However, the sub-carrier modulation method requires complicated circuitry at both ends of the communications line, and additional complexity and expense in terms of interference rejection, frequency planning, and systems design. What is needed is a simple, cost-effective means for facilitating simple communication with an antenna along a pre-existing antenna connection (such as a coaxial RF connection) that does not involve the use an RF sub-carrier.

FIG. 1 shows a block diagram of an Intelligent Antenna System 5 configured in accordance with the teaching of an embodiment. Intelligent Antenna System 5 includes a Receiver/Transmitter 80. Receiver/Transmitter 80 is device configured to utilize a signal provided by an antenna, process the signal, and use data or information encoded in the signal provided by the antenna to provide useful information to a user of Receiver/Transmitter 80. In the present embodiment, Receiver/Transmitter 80 is a navigation device, and is configured to process the signal provided by the antenna to determine at least one of a location, velocity or speed of travel of Receiver/Transmitter 80, an object (such as a vehicle) in which Receiver/Transmitter 80 is located, or a person or person in possession of Receiver/Transmitter 80. In alternative embodiments, Receiver/Transmitter 80 may be a television receiver, radio receiver, telecommunications device, computer, or other device capable of utilizing signals provided by the antenna. In yet another alternative embodiment, Receiver/Transmitter 80 may have the ability to provide useful information distant to Receiver/Transmitter 80 by encoding useful information into a signal and transmitting the useful information via an antenna.

Continuing with FIG. 1, Intelligent Antenna System 5 further includes Intelligent Antenna Controller 10 electrically coupled to Receiver/Transmitter 80. Intelligent Antenna Controller 10 is configured to receive a signal provided by an antenna, process the signal provided by the antenna, and provide the processed signal to Receiver/Transmitter 80 for decoding and further processing. In the present embodiment, Intelligent Antenna Controller 10 processes the signal provided by decoding the signals and providing some error checking and correction before providing the signal to Receiver/Transmitter 80. Intelligent Antenna Controller 10 is also shown electrically coupled to multiple Intelligent Antennas 30 by means of Conductor 18, Conductor 19, and Conductor 20, respectively. In the embodiment of FIG. 1, Conductor 18, Conductor 19 and Conductor 20 are RF shielded coaxial cables commonly referred to as Coaxial cables such as, for example, RG8, RG58, LMR400, or other coaxial cables, having a primary conductor core surrounded by an insulator encased in a conductive shield and surrounded by a rubber or poly sheath. In addition to being configured to receive and process signals provided by an antenna, Intelligent Antenna Controller 10 is further configured, in the embodiment of FIG. 1, to provide power to Intelligent Antennas 30 via Conductor 18, Conductor 19 and Conductor 20. Intelligent Antenna Controller 10 is also further configured to provide data including control signals to Intelligent Antennas 30 via Conductor 18, Conductor 19 and Conductor 20, and to receive data from Intelligent Antennas 30 via Conductor 18, Conductor 19 and Conductor 20. In alternative embodiments, Conductor 18, Conductor 19 and Conductor 20 may be conductors other than shielded coaxial cables, provided that they are capable of simultaneously carry power, data including control signals, and an antenna signal, on the primary conductor core.

FIG. 1 also shows Intelligent Antenna System 5 including Intelligent Antennas 30, each of which is electrically coupled to Intelligent Antenna Controller 10 by means of Conductor 18, Conductor 19 and Conductor 20. Each Intelligent Antenna 30 is also shown electrically connected to an Antenna Conductor 70 by means of a conductor (Conductor 60, Conductor 61 or Conductor 62). Each Intelligent Antenna 30 is configured to receive a signal from the antenna to which it is connected, process the signal, and provide it to Intelligent Antenna Controller 10 for further processing. In the embodiment of FIG. 1, each Intelligent Antenna 30 processes the signal by filtering and amplifying the signal. Filter bandwidths may be adjustable based on the messages received through the communication of Intelligent Antenna 30 with Intelligent Antenna Controller 10. Intelligent Antenna 30 may also, if it detects a strong interference level, communicate this to Intelligent Antenna Controller 10, and switch to a narrower filter bandwidth. In alternative embodiments, Intelligent Antenna 30 may process the signal by detecting multipath signals and communicating to Intelligent Antenna Controller 10 to avoid those signals. In the embodiment of FIG. 1, each Intelligent Antenna 30 includes processing circuitry configured to process the signal received from the antenna by filtering the signal. The processing circuitry requires electrical power to operate, and in the embodiment of FIG. 1, this power is provided from Intelligent Antenna Controller 10 via Conductor 60, Conductor 61 or Conductor 62. Intelligent Antenna 30 is further configured to receive from Intelligent Antenna Controller 10, via Conductor 60, Conductor 61 or Conductor 62, information in the form of data including control signals. This data including control signals is processed by Intelligent Antenna 30 to determine how to process the signal Intelligent Antenna 30 receives from the antenna to which it is electrically connected. Intelligent Antenna 30 is further configured, as will be discussed infra, to provide data to Intelligent Antenna Controller 10 via Conductor 60, Conductor 61 or Conductor 62. In the embodiment of FIG. 1, Conductor 60, Conductor 61 and Conductor 62 are RF shielded coaxial cables, such as, for example, RG8, RG58U, LMR400, or other coaxial cable, having a primary conductor core surrounded by an insulator encased in a conductive shield and surrounded by a rubber or poly sheath. In alternative embodiments, Conductor 60, Conductor 61 and Conductor 62 may be other conductors, provided that the conductor is configured to communicate a signal received by Antenna Conductor 70 to the Intelligent Antenna 30 to which the Antenna Conductor 70 is electrically connected.

FIG. 1 also shows Intelligent Antenna System 5 including Antenna Conductors 70, each of which is electrically coupled to an Intelligent Antenna 30 by means of a conductor (Conductor 60, Conductor 61 or Conductor 62). Each Antenna Conductor 70 is configured to receive a transmitted signal, and provide the transmitted signal to the Intelligent Antenna 30 to which it is electrically coupled. In the embodiment of FIG. 1, each Antenna Conductor 70 may be a patch antenna for GNSS signals (GLOBAL NAVIGATION SATELLITE SYSTEM) or a crossed dipole structure. In alternative embodiments, each Antenna Conductor 70 may be of a different type, and may include antennas such as spiral, cavity backed spiral, stacked patch, folded crossed dipole, or any antenna capable of receiving a transmitted signal.

Figure 2:
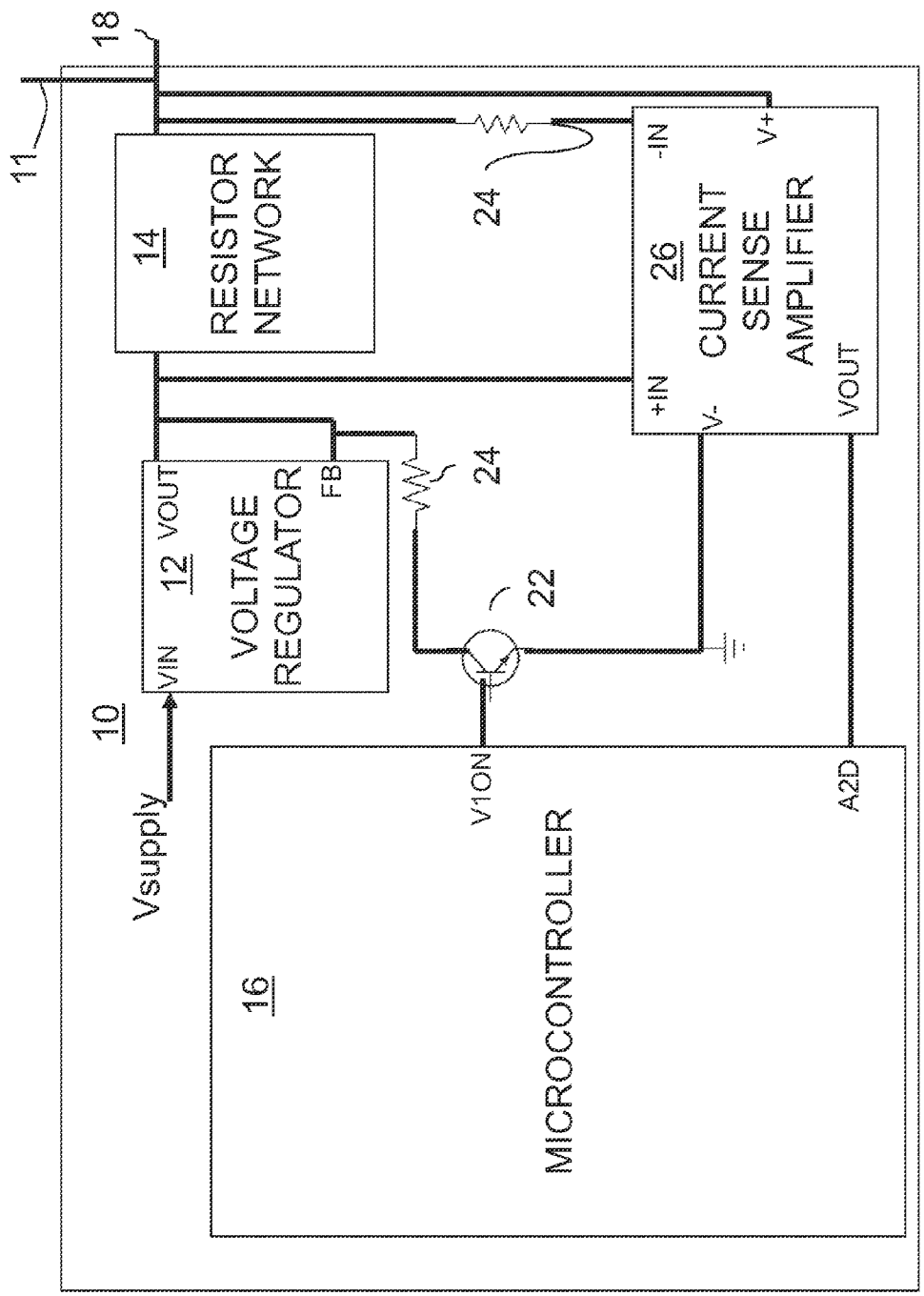
FIG. 2 shows a block diagram of an Intelligent Antenna Controller configured in accordance with the embodiment of FIG. 1.

FIG. 2 shows a block diagram of an Intelligent Antenna Controller 10 configured in accordance with the embodiment of FIG. 1. Intelligent Antenna Controller 10 includes Voltage Regulator 12. In the embodiment of FIG. 2, Voltage Regulator 12 is a low dropout (LDO) voltage regulator accepting an input voltage of approximately 3.3-5.5 Volts DC at an input VIN, and providing as an output a stable output voltage of between approximately 2.7-3.3 Volts DC at an output VOUT. Voltage Regulator 12 is shown having its input VIN electrically coupled to a supply voltage VS. In the embodiment of FIG. 2, VS is approximately 5 Volts DC. Voltage Regulator 12 is also shown having its output voltage VOUT provided back to itself at a feedback input FB, to an input of Current Sense Amplifier 26, and as an input to Resistor Network 14. Based on the signal provided at its feedback input FB, Voltage Regulator 12 determines the output voltage to provide at its output VOUT. Resistor Network 14 is configured to receive the voltage output from Voltage Regulator 12 as an input, and provide an antenna supply voltage to Intelligent Antenna 30 via Conductor 18 to power various components of Intelligent Antenna 30. Resistor Network 14 provides a Voltage drop proportional to the current pulses monitored by a Current Sense Amplifier 26 (discussed infra), such that Current Sense Amplifier 26 detects current changes. It should be appreciated that in alternative embodiments, VS may be a voltage other than approximately 5 Volts DC. It should further be appreciated that in alternative embodiments, Voltage Regulator 12 may accept different voltage ranges as an input, and may provide different voltage ranges as an output to Intelligent Antenna 30, and may or may not do so via a resistor network.

Intelligent Antenna Controller 10 is further shown comprising Microcontroller 16. In the embodiment of FIG. 2, Microcontroller 16 is a 32-bit microcontroller having, among other things, an MPU for executing software instructions, integrated Flash memory, built-in analog-to-digital and digital-to-analog converters, and multiple general-purpose I/O ports for receiving input signals or providing output signals. Microcontroller 16 is shown having one of its general-purpose I/O ports, referred to herein as V1ON, configured as an output and electrically coupled to the base of Transistor 22. In the embodiment of FIG. 2, Transistor 22 is an MMBT3904 general purpose NPN switching Bipolar Junction Transistor. Transistor 22 is shown having its emitter tied to ground, and its collector electrically coupled to the FB (feedback) input of Voltage Regulator 12 via Resistor 24. As noted above, Voltage Regulator 12 is configured to utilize the signal provided at its FB input to set the output voltage provided by Voltage Regulator 12 at its VOUT, by coupling and uncoupling Resistor 24 to the FB input of Voltage Regulator 12. In the embodiment of FIG. 2, Microcontroller 16 is running an antenna control algorithm configured to cause Microcontroller 16 to communicate with, and control, at least one Intelligent Antenna 30 electrically coupled to Intelligent Antenna Controller 10. When Microcontroller 16, responsive to the antenna control algorithm, causes V1ON to switch to providing a high level (a "1"), Transistor 22 is turned on, altering the signal provided by the collector of Transistor 22 to the FB input of Voltage Regulator 12, which in turn causes the output voltage provided at VOUT to change to a different level. This in turn causes the antenna supply voltage provided at the output of Resistor Network 14 to change to a different level. In the embodiment of FIG. 2, when V1ON has a low level (is a "0"), approximately 3.98+/−0.1 V, the antenna supply voltage is configured to have a value of approximately 3.98 Volts DC. When V1ON has a high level (is a "1"), approximately 4.83+/−0.1 V, the antenna supply voltage is configured to have a value of approximately 4.83 Volts DC. It should be appreciated that by adding or removing resistors or changing the value of resistors in Resistor Network 14 or in the network in electrical communication with the FB input, the antenna supply voltage may have other values than 3.98 Volts DC and 4.83 Volts DC. It should also be appreciated that in an alternative embodiment, by utilizing additional general purpose I/O ports and adding additional switches (transistors or otherwise) coupled to the FB input of Voltage Regulator 12 through resistors having different resistance values, the signal provided at the FB input of Voltage Regulator 12 may be altered, allowing more than two discrete voltage levels to be selected responsive to the antenna control algorithm and provided as antenna supply voltages. It should be appreciated that in the embodiment of FIG. 2, the antenna control algorithm is configured to alter the value of V1ON in a systematic manner to communicate information in the form of data, communication signals, and control signals, to Intelligent Antennas 30 to which Intelligent Antenna Controller 10 is electrically coupled. More specifically, by switching the antenna supply voltage in a predefined pattern between a high-voltage level "one" (4.83 Volts DC) and a low-voltage level "zero" (3.98 Volts DC), Microcontroller 16, by means of the antenna control algorithm, communicates data to Intelligent Antennas 30 configured to interpret and decode those voltages as data.

Intelligent Antenna Controller 10 is further shown comprising Current Sense Amplifier 26. Current Sense Amplifier 26 is configured to monitor the current drawn through Conductor 18 by an Intelligent Antenna 30 electrically coupled to Intelligent Antenna Controller 10. In the embodiment of FIG. 2, CSA is shown having its +IN input electrically coupled to VOUT of Voltage Regulator 12, its −IN input electrically coupled to Conductor 18 via RESISTOR 25, its V+ input electrically coupled to Conductor 18, its V− input electrically coupled to ground, and its VOUT output electrically coupled to Microcontroller 16 at a general purpose I/O pin defined as an A2D input A2D. Current Sense Amplifier 26 is configured to monitor the current consumed by Intelligent Antenna 30 via Conductor 18 by comparing the current at its +IN and −IN inputs, and convert that monitored current into a voltage corresponding to the current level VC at its output VOUT. Microcontroller 16 is configured to receive the voltage VC at A2D and convert the voltage into a digital value representative of the current being consumed by Intelligent Antenna 30. As will be discussed infra, Intelligent Antenna 30 is configured to consume multiple discrete levels of current, and to alter the current it consumes in a pre-defined pattern among those states to define data to be communicated by the Intelligent Antenna 30 to Intelligent Antenna Controller 10. By monitoring the pattern of the current consumed by Intelligent Antenna 30, Intelligent Antenna Controller 10, by means of the antenna control algorithm running on Microcontroller 16, is able to decipher messages and control signals communicated by Intelligent Antenna 30. In the embodiment of FIG. 2, Intelligent Antenna 30 generally consumes current at a level of 0.04 Amps, 0.054 Amps, or 0.074 Amps, and Current Sense Amplifier 26 converts those currents to voltages of 1.568 Volts DC, 2.6 Volts DC, and 2.87 Volts DC, respectively. In the embodiment of FIG. 2, 1.568 Volts are interpreted as a "0" logic level by Microcontroller 16, and 2.6 Volts and 2.8 Volts are interpreted as a logic level "1" by Microcontroller 16. By monitoring the pattern in changes in voltage provided by Current Sense Amplifier 26 (corresponding to changes in current consumed by Intelligent Antenna 30), Microcontroller 16 is able to decode information provided to Intelligent Antenna Controller 10 by Intelligent Antenna 30. It should be appreciated that in alternative embodiments, other voltage levels (corresponding to other current levels consumed by Intelligent Antenna 30) may be provided by Current Sense Amplifier 26 to Microcontroller 16, and Microcontroller 16 may interpret those voltage levels to be other than zeros or ones, provided that Microcontroller 16 is able to decode information from the systematic pattern of change in voltages (and corresponding current).

Figure 3:
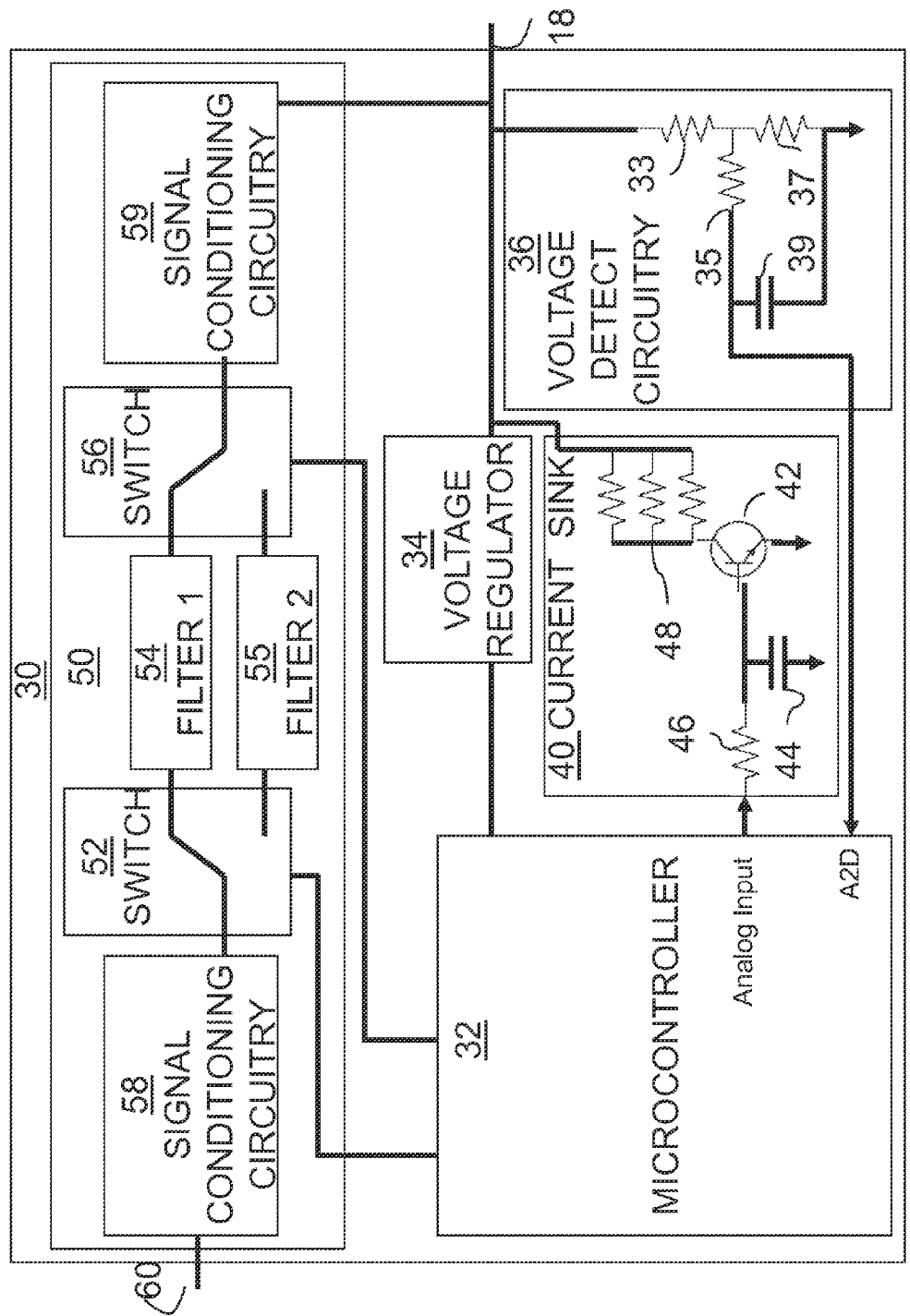
FIG. 3 shows a block diagram of an Intelligent Antenna configured in accordance with the embodiment of FIG. 1; and, FIG. 4 shows a flow chart of a method for communicating with an Intelligent Antenna, according to an embodiment.

FIG. 3 shows a block diagram of an Intelligent Antenna 30 configured in accordance with the embodiment of FIG. 1. Intelligent Antenna 30 is electrically coupled to an Antenna Conductor 70 via Conductor 60, and to Intelligent Antenna Controller 10 via Conductor 18. Intelligent Antenna 30 comprises Voltage Regulator 34 electrically coupled to Intelligent Antenna Controller 10 via Conductor 18, to Microcontroller 32, and to other components of Intelligent Antenna 30 via other internal connections (not shown). In the embodiment of FIG. 3, Voltage Regulator 34 is a low-dropout voltage regulator configured to receive an input supply voltage of between 3.3-16 Volts DC, and provide a regulated output voltage 3.0 Volts DC. In the embodiment of FIG. 3, the input supply voltage is the antenna supply voltage provided by Intelligent Antenna Controller 10 via Conductor 18, and is between 3.98

Volts DC and 4.83 Volts DC. It should be appreciated that regardless of whether the antenna supply voltage provided by Intelligent Antenna Controller 10 is 3.98 Volts DC or 4.83 Volts DC, Voltage Regulator 34 will provide 3.0 Volts DC as an output to Microcontroller 32 and other components of Intelligent Antenna 30, allowing Intelligent Antenna 30 to function. Intelligent Antenna 30 further comprises Voltage Detect Circuitry 36 having its input electrically coupled to Conductor 18 and its output electrically coupled to Microcontroller 32. In the embodiment of FIG. 3, Voltage Detect Circuitry 36 comprises three resistors, Resistor 33, Resistor 35 and Resistor 37, and Capacitor 39. In the embodiment of FIG. 3, Resistor 33 has a value of 10K Ohms, Resistor 35 has a value of 1K Ohm, Resistor 37 has a value of 2K Ohms, and Capacitor 39 has a value of 1 nano-Farad. As configured in FIG. 3, Voltage Detect Circuitry 36 has the effect of scaling down the voltage present on Conductor 18 (the antenna supply voltage provided by Intelligent Antenna Controller 10) before providing it to Microcontroller 32. More specifically, when the antenna supply voltage has a value of approximately 3.98 Volts DC, Voltage Detect Circuitry 36 provides a voltage of approximately 0.72 Volts DC at its output, and when the antenna supply voltage has a value of approximately 4.83 Volts, Voltage Detect Circuitry 36 provides a voltage of approximately 0.86 Volts DC at its output.

Intelligent Antenna 30 is further shown comprising Microcontroller 32. In the embodiment of FIG. 3, Microcontroller 32 is a microcontroller having, among other things, an MPU for executing software instructions, integrated Flash memory, built-in analog-to-digital and digital-to-analog converters, and multiple general-purpose I/O ports for receiving input signals or providing output signals. As shown, the output of Voltage Detect Circuitry 36 is electrically coupled to Microcontroller 32 at a general purpose I/O pin defined as an A2D input A2D. In the embodiment of FIG. 3, Microcontroller 32 is running an antenna algorithm configured to cause Microcontroller 32 to communicate with an Intelligent Antenna Controller 10 electrically coupled to Intelligent Antenna 30, and to take action based on information received from Intelligent Antenna Controller 10. Microcontroller 32 receives the voltages from Voltage Detect Circuitry 36 at A2D, converts the analog voltage to a digital value representative of the analog voltage, and evaluates the digital value over time to ascertain if any coherent messages (based on the variation in the pattern of the digital values) are being transmitted by Intelligent Antenna Controller 10 to Intelligent Antenna 30. If Microcontroller 32 determines that messages are being sent, Microcontroller 32 codes the messages, and takes action based on the content of the messages. This action might include changing some parameter or function or Intelligent Antenna 30, or communicating a message to Intelligent Antenna Controller 10 (discussed infra). As noted above, in the embodiment of FIG. 3, the DC voltages provided to Microcontroller 32 by Voltage Detect Circuitry 36 are 0.72 Volts DC or 0.86 Volts DC, which are interpreted by Microcontroller 32 as a logical 0 and a logical 1, respectively. It should be appreciated that based on the pattern of 0s and 1s received by Microcontroller 32 over time, Microcontroller 32 may interpret messages represented by those 0s and 1s transmitted by Intelligent Antenna Controller 10.

Intelligent Antenna 30 is further shown comprising Current Sink 40. In the embodiment of FIG. 3, Current Sink 40 is shown having one connection (referred to for purposes of simplicity as an input) electrically coupled to an analog input of Microcontroller 32, and having another connection (referred to for purposes of simplicity as an output) electrically coupled to Conductor 18. More specifically, in the embodiment of FIG. 3, Current Sink 40 comprises three resistors, each referred to as Resistor 48, each having one end electrically coupled to Conductor 18, and each having its opposite end electrically coupled to the collector of a transistor, Transistor 42. In the embodiment of FIG. 3, each of resistors Resistor 48 has a value of 1K Ohm. Current Sink 40 is further shown comprising Transistor 42. Transistor 42 has its collector electrically coupled to Resistor 48 and its emitter electrically coupled to ground. Current Sink 40 is further shown comprising Capacitor 44 and Resistor 46. One end of each of Capacitor 44 and Resistor 46 is tied together and to the base of Transistor 42. The remaining end of Capacitor 44 is tied to ground, and the remaining end of Resistor 46 is electrically coupled to an analog input of Microcontroller 32. In the embodiment of FIG. 3, Capacitor 44 has a value of 1 nano-Farad, and Resistor 46 has a value of 1K Ohm.

As configured in FIG. 3, and as discussed infra, Current Sink 40 has the effect, responsive to Microcontroller 32, of varying the current drawn by Intelligent Antenna 30 via Conductor 18. More specifically, when the analog input of Microcontroller 32 is switched on by means of an antenna algorithm running in Microcontroller 32, Transistor 42 is turned on, causing an additional, predictable amount of current to be consumed by Current Sink 40 and Intelligent Antenna 30. In the embodiment of FIG. 3, when Microcontroller 32 causes the analog input electrically coupled to Current Sink 40 to be switched off, Transistor 42 is off, and the overall current consumption of Intelligent Antenna 30 via Conductor 18 is approximately 0.054 Amps. When Microcontroller 32 causes the analog input electrically coupled to Current Sink 40 to be switched on, Transistor 42 is turned on, and the overall current consumption if Intelligent Antenna 30 via Conductor 18 is increased to approximately 0.074 Amps. It should be understood that when these current variations occur in a predictable, systematic manner, Intelligent Antenna 30 may communicate messages, via Conductor 18, to an Intelligent Antenna Controller 10 to which Intelligent Antenna 30 is electrically coupled. It should also be appreciated that in alternative embodiments, components of Current Sink 40 and Intelligent Antenna 30 may be selected such that the current consumption by Current Sink 40 and Intelligent Antenna 30 is different than that in the embodiment of FIG. 3, provided that Current Sink 40 and Intelligent Antenna 30 provide at least two predetermined, discrete levels of current consumption. In addition, it should also be appreciated that in yet another alternative embodiment, Current Sink 40 may be configured to conclude additional components, such as transistors or components to sink current, in parallel, each which may be switched in or out by Microcontroller 32, providing more than two discrete levels of current drawn by Current Sink 40 and Intelligent Antenna 30. In this manner, a more sophisticated communication scheme may be implemented other than one involving switching between two states or values of current consumption.

In the embodiment of FIG. 3, Microcontroller 32 is running an antenna algorithm configured to cause Microcontroller 32 to communicate with an Intelligent Antenna Controller 10 electrically coupled to Intelligent Antenna 30, and to take action based on information received from Intelligent Antenna Controller 10. To send a message to an Intelligent Antenna Controller 10, Microcontroller 32 first determines the message to send, and the necessary pattern of 0s (low current consumption) and is (high current consumption) that need to be communicated to Intelligent Antenna Controller 10 via Conductor 18. Microcontroller 32 then switches the analog input such that Current Sink 40 switches, in the appropriate pattern, between low and high current consumption states for Intelligent Antenna 30. Intelligent Antenna Controller 10 detects these changes in consumed current, interprets them as 0s and 1s, and decodes the message(s) (as described previously). It should be appreciated that in the embodiment of FIG. 3, the antenna algorithm is configured to alter the value of current consumption of Intelligent Antenna 30 in a systematic manner to communicate information in the form of data, communication signals, and control signals, to Intelligent Antenna Controller 10s to which Intelligent Antenna 30 is electrically coupled. More specifically, by switching the current consumption in a predefined pattern between a high-current level "one" (0.07 Amps) and a low-voltage level "zero" (0.05 Amps), Microcontroller 32, by means of the antenna algorithm, communicates data to an Intelligent Antenna Controller 10 configured to interpret and decode those current fluctuations as data. In this manner, Intelligent Antenna 30 may communicate various messages and information to an Intelligent Antenna Controller 10 to which it is electrically coupled.

Intelligent Antenna 30 is further shown comprising Antenna Signal Processing Circuitry 50. Antenna Signal Processing Circuitry 50 is electrically coupled to an Antenna Conductor 70 via Conductor 60, and is configured to receive a transmitted signal containing information (the received signal RS) from a transmitter that has been detected by Antenna Conductor 70 via Conductor 60, and process the RS. Antenna Signal Processing Circuitry 50 is also electrically coupled to Intelligent Antenna Controller 10 via Conductor 18, and is configured to provide the processed RS to Intelligent Antenna Controller 10 via Conductor 18. Antenna Signal Processing Circuitry 50 is also electrically coupled to Microcontroller 32, and is configured to alter its processing of the RS responsive to signals received from Microcontroller 32. As shown, Antenna Signal Processing Circuitry 50 comprises Signal Conditioning Circuitry 58 electrically coupled to Antenna Conductor 70 via Conductor 60. Signal Conditioning Circuitry 58 is configured to perform some initial processing of the RS before passing the pre-processed RS on to other circuitry of Antenna Signal Processing Circuitry 50. In the embodiment of FIG. 3, Signal Conditioning Circuitry 58 may operate to separate bands in the RS if there are multiple bands in the signal (for example, if there are multiple bands such as a low-rate communication band, DC power band, and RF signals). It should be appreciated that in some GNSS signals, there are two major RF bands commonly referred to as L1 and L2, which are 1.166 to 1.28 GHz and 1.525 to 1.610 GHz, respectively. It may be advantageous to separate these bands for filtering out of band interference and for amplification. Signal Conditioning Circuitry 58 may need to amplify the RF signals by approximately 28 dB, and in some cases by 40 dB, depending on the application. Signal Conditioning Circuitry 58 may also contain ESD (ElectroStatic Discharge) protection, or other surge protection such as lightning arrestors.

Antenna Signal Processing Circuitry 50 further comprises Switch 52 electrically coupled to an output of Signal Conditioning Circuitry 58. Signal Conditioning Circuitry 58 is further electrically coupled to multiple filters, Filter 54 and Filter 55, and to Microcontroller 32. Switch 52 is configured, responsive to a signal provided by Microcontroller 32, to switch the position of Switch 52 such that the pre-processed RS travels to an input of either Filter 54 or Filter 55 based on the signal from Microcontroller 32. Each of Filter 54 and Filter 55 has its output electrically coupled to the inputs of an additional switch, Switch 56. Switch 56 is also electrically coupled to Microcontroller 32, and is configured, responsive to a signal provided by Microcontroller 32, to provide the output of either Filter 54 or Filter 55 as an output of Switch 56.

Antenna Signal Processing Circuitry 50 further comprises Signal Conditioning Circuitry 59. The input of Signal Conditioning Circuitry 59 is electrically coupled to the output of Switch 56, and is configured to provide additional processing to the filtered RS before providing the additionally processed, filtered signal at its output. In the embodiment of FIG. 3, Signal Conditioning Circuitry 59 has its output electrically coupled to Intelligent Antenna Controller 10 via Conductor 18 such that the processed, filtered RS is provided to Intelligent Antenna Controller 10 for use by Intelligent Antenna Controller 10 and other components coupled to Intelligent Antenna Controller 10. In operation, Intelligent Antenna 30 receives a signal via Conductor 60 from Antenna Conductor 70. Responsive to an antenna algorithm running in Microcontroller 32, Antenna Signal Processing Circuitry 50 processes and filters the received signal (selecting various processing and filtering modes based on input received from Microcontroller 32, which has in turn been received from Intelligent Antenna Controller 10), and provides the filtered, processed signal to Intelligent Antenna Controller 10.

It should be appreciated that although the embodiment of FIG. 3 generally illustrates Intelligent Antenna 30 selecting from among multiple filters, in alternative embodiments, Intelligent Antenna 30 and Intelligent Antenna Controller 10 may be configured so provide for, and switch among, many other possible signal processing and filtering options, based on communication between Intelligent Antenna 30 and Intelligent Antenna Controller 10. Examples of other processing and filtering options that might be provided (and selected from) in alternative embodiments include, but are not limited to, monitoring RF bands for correction services, removing RF bands to avoid interference, detection and communication of interference in multiple RF bands, detection of signals of interest and communication of the same to receivers, and detection of (and communication of) multi-path signals or signals having incorrect polarization.

Referring to FIGS. 1-3 collectively, the general operation of Intelligent Antenna System 5, according to the embodiment of FIGS. 1-3, will be described. Intelligent Antenna Controller 10, responsive to the antenna control algorithm, initiates voltage switching between separate and distinguishable voltage levels in the voltage provided to Intelligent Antenna 30, thereby encoding a digital bit stream of information on Conductor 18, the power line to Intelligent Antenna 30. Intelligent Antenna 30 is configured to be normally operational over a wide input voltage range such that it will operate normally at both the highest switched and the lowest switched voltage received from Intelligent Antenna Controller 10. The input voltage provided by Intelligent Antenna Controller 10 to Intelligent Antenna 30 is taken from Conductor 18 and measured in Intelligent Antenna 30. The voltage difference between the highest switched voltage and lowest switched voltage is set in Intelligent Antenna 30 such that the variation in the supplied voltage is above any nominal system noise transferred along the power line. It is also set such that there is enough of a difference among the voltage levels that the different voltage levels are easily distinguishable, but are still within the operating tolerances of Intelligent Antenna 30 itself. Encoding of the data (voltage transitions) by Intelligent Antenna Controller 10, and decoding of the data by Intelligent Antenna 30, takes place in an asynchronous manner, such that no common clock is required by either Intelligent Antenna Controller 10 or Intelligent Antenna 30 to coordinate bit edges. The asynchronous nature of the digital bit stream allows for true single wire communication of the encoded signal between Intelligent Antenna Controller 10 and Intelligent Antenna 30. Intelligent Antenna 30, by decoding the bit stream of stepped voltage variations, is able to deduce the bit stream of information and respond accordingly by taking some action in Intelligent Antenna 30 or communicating some information to Intelligent Antenna Controller 10. The bit stream is an encoded message of information from Intelligent Antenna Controller 10.

Intelligent Antenna 30, when powered on for the first time, might not know if the connected Intelligent Antenna Controller 10 is capable of bi-directional voltage variance communications. In the embodiment of FIGS. 1-3, Intelligent Antenna 30 defaults its behavior to a standard mode of operation, or a saved mode from previous communications, until such time as a valid communications packet from Intelligent Antenna Controller 10 is decoded by Intelligent Antenna 30. When detecting the supply voltage level from Intelligent Antenna Controller 10, Intelligent Antenna 30 may sample the voltage at a rate of at least twice the anticipated bit rate of the data transfer in order to avoid aliasing or missed bits in the transmission. Once decoded, messages received by Intelligent Antenna 30 may be used to change its operating mode, to change specific parameters for various circuitry within Intelligent Antenna 30, to communicate back to Intelligent Antenna Controller 10, and/or to cause Intelligent Antenna 30 to act in any other appropriate manner relative to its features and available functionality. For example, Intelligent Antenna 30, responsive to a message received from Intelligent Antenna Controller 10, may switch in or out various filters applied to the antenna signal received from Antenna Conductor 70 before that signal is supplied to Intelligent Antenna Controller 10 via Conductor 18.

For communications along the same RF line Conductor 18 from Intelligent Antenna 30 to Intelligent Antenna Controller 10, Intelligent Antenna 30, in the embodiment of FIGS. 1-3, employs Current Sink 40 and Microcontroller 32. Microcontroller 32, by switching Current Sink 40 between separate and distinguishable current consumption levels of Intelligent Antenna 30, is able to encode a digital bit stream of information on line Conductor 18 to Intelligent Antenna Controller 10. That is, Intelligent Antenna 30 purposely uses a predefined and deterministic amount of additional current when transmitting messages to Intelligent Antenna Controller 10. By switching in and out the predetermined current via Current Sink 40, Intelligent Antenna 30 effectively changes its current consumption in a deterministic fashion between at least two values corresponding to a high and low current consumption level. Multiple stepped current consumption levels can be used as a means of transferring multiple bits of information per current consumption transition. The current consumption transitions need not only be between two levels, but could be setup in such a way as to allow a multitude of distinguishable current consumption levels to indicate multibit states for communications. Intelligent Antenna 30 may also use a linear regulator to provide power for the main low noise amplifying (LNA) circuitry so that the current drain is essentially stable during normal operations, and also remains stable during voltage variations due to switched voltage changes from Intelligent Antenna Controller 10. As a result, during voltage switching communications from the Intelligent Antenna Controller 10, the current drain from the antenna remains stable. Additionally, any measured current fluctuations at Intelligent Antenna Controller 10 due to the current sync functionality of Intelligent Antenna 30 can be attributed solely to the communications protocol.

In the embodiment of FIGS. 1-3, Intelligent Antenna Controller 10 monitors the current drain of Intelligent Antenna 30 to determine a nominal baseline consumption, prior to transmitting voltage variance messages. The current consumption of Intelligent Antenna 30 is subsequently measured by Intelligent Antenna Controller 10 to determine if messages are being sent by variations in the current consumption of Intelligent Antenna 30. The current consumption difference provided by Intelligent Antenna 30 during communication with Intelligent Antenna Controller 10 must be such that the variation in measured current consumption variance is above any nominal system variation measured during normal operations of Intelligent Antenna 30, and such that the difference in current consumption levels is easily distinguishable by Intelligent Antenna Controller 10. The current consumption should also remain within the operating tolerances of Intelligent Antenna 30, and within the measurable range of consumption values at Intelligent Antenna Controller 10. Encoding and decoding of the data by Intelligent Antenna 30 is done in an asynchronous manner, meaning there is no common clock required at either Intelligent Antenna 30 or Intelligent Antenna Controller 10 in order to coordinate bit edges. The asynchronous nature of the digital bit stream allow for true single wire communication of an encoded signal between the connected devices. Intelligent Antenna Controller 10, in decoding the bit stream of stepped current consumption variations, is able to deduce the bit stream of information and act accordingly by taking some action in Intelligent Antenna Controller 10 or communicating some information to Intelligent Antenna 30. The bit stream is an encoded message of information from the antenna to the receiver. Once decoded, messages received by Intelligent Antenna Controller 10 may be used to change its operating mode, to change specific parameters for various circuitry within Intelligent Antenna Controller 10, to communicate back to Intelligent Antenna 30, and/or to cause Intelligent Antenna Controller 10 to act in any other appropriate manner relative to its features and available functionality.

It should be appreciated that during the transfer of data from Intelligent Antenna Controller 10 to Intelligent Antenna 30 using stepped variable voltage as described above, Intelligent Antenna 30 may communicate in a simplex manner in which it does not change its own current consumption during the variable voltage data transfer. However, it should also be appreciated that duplex communications between Intelligent Antenna Controller 10 and Intelligent Antenna 30 may also be realized by knowing the supplied voltage level and determining the total power drawn by Intelligent Antenna 30. Variations in the incoming voltage level to Intelligent Antenna 30 are independent of the switched current sync functionality provided by Intelligent Antenna 30, and both voltage and current variation may occur at the same time, allowing for duplex communication.

Although the discussion above has centered upon a configuration involving one Intelligent Antenna Controller 10 and one Intelligent Antenna 30, it should be appreciated, as generally illustrated in FIG. 1, that multiple Intelligent Antennas 30, each of which may have its own antenna, may be electrically coupled to an Intelligent Antenna Controller 10 via independent coaxial connections (shown as 60, 61 and 62 in FIG. 1). It should also be appreciated that on system initialization in a system involving one Intelligent Antenna Controller 10 and one Intelligent Antenna 30, Intelligent Antenna Controller 10 may act as the system master, while Intelligent Antenna 30 may act as a slave device. In a situation involving multiple antennas and multiple Intelligent Antennas 30, Intelligent Antenna Controller 10 may act as the master to each independently connected Intelligent Antenna 30. However, in an alternative embodiment, Intelligent Antenna Controller 10 and Intelligent Antennas 30 need not operate in a master slave orientation.

In the embodiment of FIGS. 1-3, Intelligent Antenna Controller 10, at initialization, may interrogate Intelligent Antenna 30 by sending it a variable voltage digital encoded signal to see if Intelligent Antenna 30 understands the output fluctuations as a message. It does so by observing the current consumption of Intelligent Antenna 30 to determine if the pattern of current consumption of Intelligent Antenna 30 is a meaningful message. In the absence of a meaningful message from Intelligent Antenna 30 in the form of an encoded current consumption signal, the Intelligent Antenna Controller 10 will assume that Intelligent Antenna 30 is not capable of communication, and after a certain number of attempts at communicating with Intelligent Antenna 30, will fall back to a standard mode of operation in which there is no communication between Intelligent Antenna Controller 10 and Intelligent Antenna 30. It should be appreciated that the communication capability of Intelligent Antenna Controller 10 and Intelligent Antenna 30 may be switched on or off, or monitored, via software running in Intelligent Antenna Controller 10 and/or Intelligent Antenna 30. Similarly, upon system initialization in Intelligent Antenna 30, Intelligent Antenna 30 will observe the voltage level supplied to it for operation in order to discern any message encoded in the signals of the voltage as a meaningful message. In the absence of a meaningful message from Intelligent Antenna Controller 10, Intelligent Antenna 30 will fall back to either a previously commanded default state, or a nominal, "no communication" mode of operation. As discussed, Intelligent Antenna System 5 provides for automatic detection and continued operation of each individual component (Intelligent Antenna Controller 10 and/or Intelligent Antenna 30) even when the component to which each is connected is incapable of communication. More specifically, an Intelligent Antenna Controller 10 will function normally with an antenna that does not include the features of Intelligent Antenna 30, and an Intelligent Antenna 30 will function normally with a receiver that does not include the features of an Intelligent Antenna Controller 10, even though communication is not taking place between the devices.

Referring to FIGS. 1-3, the encoding and decoding of messages by Intelligent Antenna Controller 10 and Intelligent Antenna 30 will now be discussed. In the embodiment of FIGS. 1-3, data transmitted by Intelligent Antenna Controller 10 via changes in the voltage provided by Intelligent Antenna Controller 10, and data transmitted by Intelligent Antenna 30 via changes in current consumption of Intelligent Antenna 30, may be transmitted as a square waveform. Each data bit may also be phase encoded such that each data bit has one square wave transition. A "1" data bit may be encoded as 10 and a '0' data bit may be encoded as a 01 by using an internally generated (in Intelligent Antenna Controller 10 and/or Intelligent Antenna 30) clock for the square wave generation. It should be appreciated that this may be consistent with a Manchester encoding scheme. This isochronous signal may be self-clocking, in that a clock signal may be recovered from the encoded data by sampling the signal at a minimum rate equivalent to twice the anticipated maximum clocking rate of the phase encoded data. In this case, each clocked data bit encompasses two clock pulses. It should be appreciated that self-clocking is less susceptible to errors introduced by Intelligent Antenna Controller 10 or Intelligent Antenna 30 clock jitter, and requires no common clock between Intelligent Antenna Controller 10 and Intelligent Antenna 30 to recover the encoded data. It should be appreciated that this is a simple form of binary phase-shift keying controlling a square wave.

It should also be appreciated that by ensuring regular voltage or current transitions that are directly proportional to the clocking rate, clock recovery and bit decoding will be less error prone. The decoder of the transmitted, encoded data (Intelligent Antenna Controller 10 or Intelligent Antenna 30, as the case may be) may be configured to monitor the voltage or current transitions at the mid-bit alignment point in order to deduce the encoded data. The clocking rate may depend on the noise characteristics of the Voltage Regulator 12 in Intelligent Antenna Controller 10 and Current Sink 40 in Intelligent Antenna 30, as well as on rise and fall times of the transition periods between the high and low states of Intelligent Antenna Controller 10 and Intelligent Antenna 30. The maximum clocking rate, and thereby the maximum bit rate of the transmitted data, will also be a function of these parameters. The transmit data rate from Intelligent Antenna Controller 10 need not be the same as the transmit data rate from Intelligent Antenna 30 if the systems characteristics of the underlying data transition elements in Intelligent Antenna Controller 10 and Intelligent Antenna 30 produce differing square-wave edge detect transitions.

In the embodiment of FIGS. 1-3, to guard against false synchronization or false clock detection, the initial or idle system state of Intelligent Antenna Controller 10 and Intelligent Antenna 30 may be in the "low" or "0" state. More specifically, for Intelligent Antenna Controller 10, the initial output voltage may be set at the lowest output voltage level, and for Intelligent Antenna 30, the initial current consumption level may be set at the lowest current consumption level. During this initial state, the encoded data on the line will be constant and non-changing. When initiating a message between devices, the first data bit may be a '1' bit, ensuring a high-low transition in the encoded data stream. This increases the data transmission overhead by one bit, but provides a "wake from sleep" signal that can be used as a signal by the software of the receiving device to wake from a sleep state and begin capturing and decoding messages. A "wake from sleep" signal would be useful when Intelligent Antenna Controller 10, Intelligent Antenna 30, or both are configured such that between receiving messages and when not transmitting messages, certain elements of Intelligent Antenna Controller 10 and/or Intelligent Antenna 30 may be put into a sleep state, ensuring low power operation when no communication is taking place. It should further be appreciated that this initial mandatory bit transition between defined states (1 to 0 in the case of a "1", or 0 to 1 in the case of a "0") effectively serves as a start-bit in the encoded data stream. A stop bit is unnecessary as when the transmission of the data frame is complete, the encoded data will return to the low state and there will be no further bit transitions on the line. In the present embodiment, the decoding software in Intelligent Antenna Controller 10 and/or Intelligent Antenna 30 can be certain the end of the message has been received, and begin processing the received message, after three successive clocks of the low data state have elapsed, regardless of the last data bit transmitted in the data stream.

It should also be appreciated that the data frame message content may be variable, provided that the data frame includes a start bit, followed by data frame message content, and further followed at the end of the data frame by a return to the low state for three clocks following the end of the transmission, before the next message frame can commence. Any known data integrity, error detection, or error correction schemes may be used on top of or as part of the underlying square wave data transfer protocol. As one example protocol for the communication messages utilized according to the embodiment of FIGS. 1-3, a message may consists of a start bit, 2 bits to define a status of the transmitted message, 6 bits defining a parameter identification to be acted on by the device receiving the message, an 8 bit checksum for message integrity verification, additional data of indeterminate length, followed by a low state ("0"s) for three successive clocks. On startup, Intelligent Antenna Controller 10 may transmit a 'read' status message to Intelligent Antenna 30, inquiring about the antenna serial number, version, revision, or capabilities. Such simple query messages may not include the transmission of any additional data other than the start bit, status, query parameter identification, and checksum. Continuing with this example, Intelligent Antenna 30 may, upon reception and decoding of any of these query messages, respond with its serial number, version, revision, or capabilities. The response may take the form of a start bit, an 'ok' state response to a known parameter or 'error' state response to an unknown parameter, a 6 bit parameter ID, a message checksum for integrity verification, a variable number of bytes of data corresponding to the queried parameter, and "0"s for three successive clocks.

It should be appreciated that in alternative embodiments, various features of Intelligent Antenna 30 may also be controlled, such as, for example in the case where Intelligent Antenna 30 employs additional general purpose I/O routed to control a single-pole four-throw (SP4T) switch designed for general purpose RF switching applications. This RF switching may be used to select different frequency bands available within Intelligent Antenna 30. By switching filter components or frequency bands within Intelligent Antenna 30, interference avoidance can be optimized. Alternatively, different functionality available in different frequency bands may be used by Intelligent Antenna Controller 10 when Intelligent Antenna 30 operates in certain modes. For example, if Intelligent Antenna Controller 10 is not capable of using a specific frequency from the Antenna Conductor 70 pass band, Intelligent Antenna Controller 10 could command Intelligent Antenna 30 to narrow its frequency band to only that portion of the spectrum Intelligent Antenna Controller 10 can utilize, thereby limiting the possibility of out-of-band interference denigrating the performance of Intelligent Antenna Controller 10 or D80s connected thereto. A representative message from Intelligent Antenna Controller 10 to effect this operation may consist of a start bit, 2 bits to define a status of the transmitted message, 6 bits defining a parameter ID corresponding to filter characteristics, an 8 bit checksum for message integrity verification, additional data bits indicating each filter on/off state that Intelligent Antenna 30 should switch, followed by three "0"s. The response from Intelligent Antenna 30 may be a start bit, a 2 bit 'ok' state response to the known parameter (or 'error' state response to an unknown parameter or filter switching error), a 6 bit parameter ID, message checksum for integrity verification, followed by three "0"s.

Although the above have provided examples of utilization of the communication scheme between Intelligent Antenna Controller 10 and Intelligent Antenna 30 via Conductor 18, it should be appreciated that various other communication schemes may be constructed utilizing the high/low ("1"/"0") voltage and current switching capabilities of Intelligent Antenna Controller 10 and Intelligent Antenna 30. It should also be appreciated that in alternative embodiments in which Intelligent Antenna Controller 10 and/or Intelligent Antenna 30 are configured to switch voltages and/or currents among more than a high/low ("1"/"0") states (for example, if Intelligent Antenna Controller 10 and/or Intelligent Antenna 30 are configured to switch between three or more states), additional, more complex communication scheme and protocols may be implemented, providing for higher-bandwidth communication between Intelligent Antenna Controller 10 and/or Intelligent Antenna 30.

Figure 4:
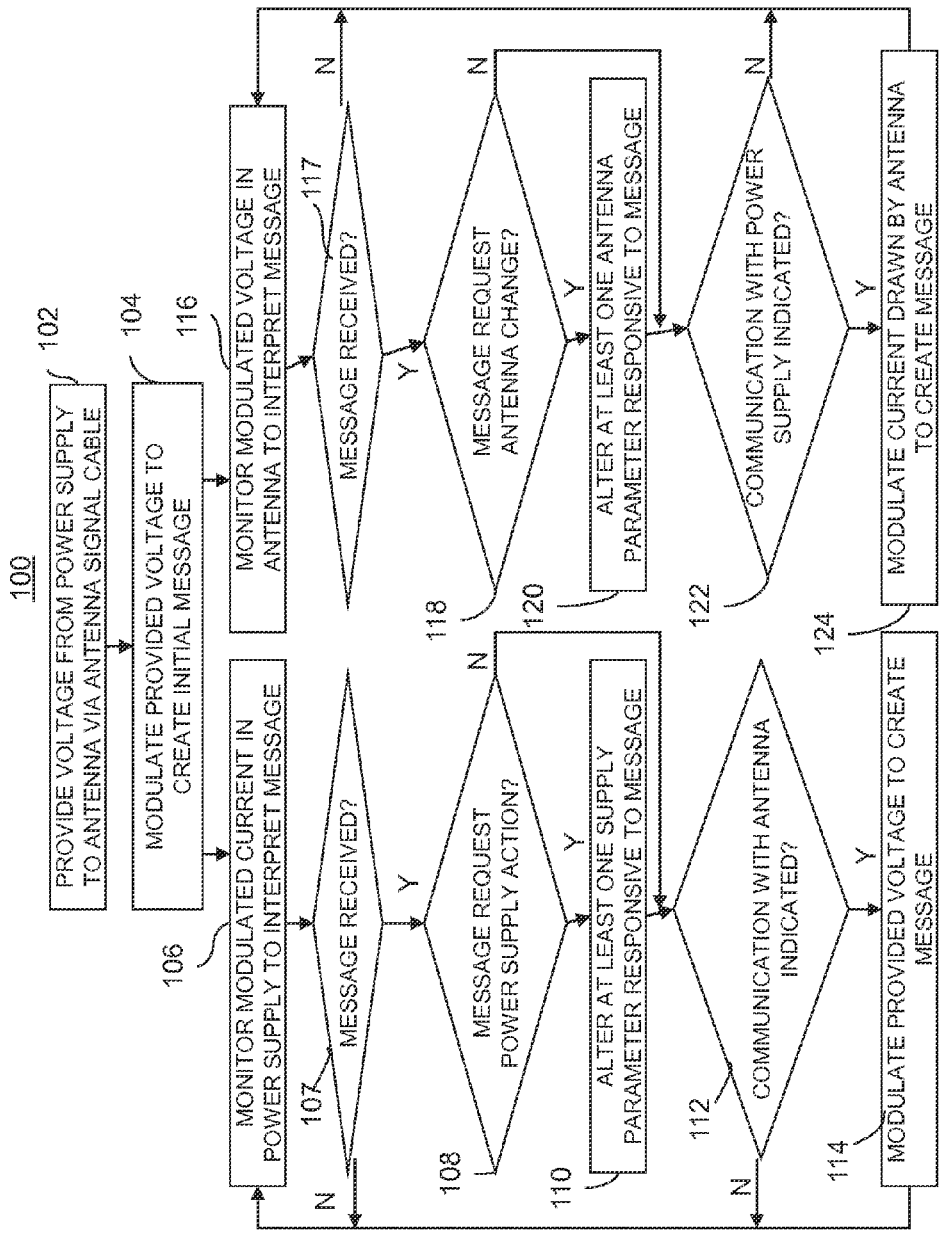

FIG. 4 shows a flow chart of a method 100 for communication with an antenna. In an embodiment, the method 100 is implemented by Intelligent Antenna System 5 generally illustrated in FIGS. 1-3. In a first operation 102, a voltage is provided from a power supply to an antenna via an antenna signal cable. In a second operation 104, the provided voltage is modulated to communicate an initial message. Discussion of the method 100 will now proceed with respect to elements of the method performed in the power supply. In a third operation 106, current drawn by the antenna via the antenna signal cable is monitored for variation in order to interpret any messages being communicated by the antenna. In a fourth operation 107, the power supply determines if there is a message being communicated by the antenna. If no message is being communicated, the method returns to operation 106. If a message is being communicated, the method continues on to 108. In a fifth operation 108, the power supply determines if the message being communicated by the antenna requires action by the power supply. If no action is being requested of the power supply, the method proceeds to operation 112. If action is being requested of the power supply, the method proceeds to a sixth operation 110, in which at least one parameter of the power supply is altered responsive to the message. If no action is being requested of the power supply, the method proceeds to operation 112. In a seventh operation 112, the power supply determines if the message being communicated by the antenna requires communication with the antenna. If no communication with the antenna is required, the method returns to operation 106. If communication with the antenna is required, the method proceeds to 114. In an eighth operation 114, the voltage provided to the antenna by the power supply is modulated to communicate a message to the antenna. Subsequent to the completion of operation 114, the method returns to operation 106.

Discussion of the method 100 will now proceed with respect to elements of the method performed in the antenna. In a third antenna operation 116, voltage provided by the power supply via the antenna signal cable is monitored for variation in order to interpret any messages being communicated by the power supply. In a fourth operation 117, the antenna determines if there is a message being communicated by the antenna. If no message is being communicated by the antenna, the method returns to operation 116. If a message is being communicated, the method continues on to 118. In a fifth operation 118, the antenna determines if the message being communicated by the power supply requires action such as a change in a parameter of the antenna. If no action is being requested of the antenna, the method proceeds to operation 122. If action is being requested of the antenna, the method proceeds to a sixth operation 120, in which at least one parameter of the antenna is altered responsive to the message. In a seventh operation 122, the antenna determines if the message being communicated by the power supply requires communication with the power supply. If no communication with the antenna is required, the method returns to operation 116. If communication with the antenna is required, the method proceeds to 144. In an eighth operation 124, the current drawn by the antenna is modulated to communicate a message to the power supply. Subsequent to the completion of operation 124, the method returns to operation 116. It should be appreciated that in alternative embodiments, the order of the steps of the method may be changed.

Embodiments described herein provide for a system and method for communication between an antenna power supply and antennas via a power cable connecting the power supply to each antenna, without the need for additional communication wires or busses between the power supply and antennas. The system and method allow for bi-directional or uni-directional communication of status and control information between an antenna power supply and multiple antennas connected thereto, and further allows for both simplex and duplex communication between the antenna power supply and antenna. The system and method further allow for power to be provided to the antennas from the power supply, and RF (or other) antenna signals received by the antenna to be passed on to the antenna power supply. The system and method provide that all of the communication of status and control information, the provision of power to the antenna, and the transmission of the RF (or other) signal received by the antenna to be provided between the power supply and each antenna to which it is connected via a single RF coaxial (or similar single-wire) cable between the power supply and each antenna to which it is coupled.

Although the preferred embodiments of the invention have been illustrated and described in detail, it will be readily apparent to those skilled in the art that various modifications may be made therein without departing from the spirit of the invention or from the scope of the appended claims.

What is claimed is:

1. An Intelligent Antenna System comprising:
    a first antenna conductor configured to intercept a transmitted signal and conduct at least a portion of the transmitted signal into the first antenna conductor;
    a conductor comprising the conductor electrically coupled to the first antenna conductor and configured to communicate the transmitted signal along the conductor to other devices electrically coupled to the conductor;
    a first intelligent antenna electrically coupled to the conductor and configured to receive the transmitted signal via the conductor, process the transmitted signal to alter at least one characteristic of the signal, and provide processed; transmitted signal external to the first intelligent antenna;
    a conductor comprising a conductor electrically coupled to the first intelligent antenna and configured to communicate the processed; transmitted signal along the conductor to other devices electrically coupled to the conductor; and,
    an intelligent antenna controller electrically coupled to the conductor and configured to receive the processed, transmitted signal and further process the processed, transmitted signal, wherein the intelligent antenna controller is further configured to provide power for operation of the first intelligent antenna to the first intelligent antenna via the conductor of conductor over which the processed; transmitted signal is communicated, and wherein the intelligent antenna controller is further configured to communicate data to the first intelligent antenna via the conductor of conductor over which the processed transmitted signal and power are communicated.

2. An Intelligent Antenna System as claimed in claim 1 wherein the first intelligent antenna is further configured to interpret data communicated to the first intelligent antenna by the intelligent antenna controller via the conductor of conductor over which the data is communicated.

3. An Intelligent Antenna System as claimed in claim 2 wherein the first intelligent antenna is further configured to alter its operation responsive to the interpreted data communicated by the intelligent antenna controller.

4. An Intelligent Antenna System as claimed in claim 3, further comprising:
    a second antenna conductor configured to intercept a transmitted signal and conduct at least a portion of the transmitted signal into the antenna conductor;
    a conductor comprising a conductor electrically coupled to the second antenna conductor and configured to communicate the transmitted signal along the conductor to other devices electrically coupled to the conductor;
    a second intelligent antenna electrically coupled to the conductor and configured to receive the transmitted signal via conductor, process the transmitted signal to alter at least one characteristic of the signal, and provide the processed, transmitted signal external to the second intelligent antenna; and,
    a conductor comprising a conductor electrically coupled to the second intelligent antenna and configured to communicate the processed, transmitted signal along the conductor to other devices electrically coupled to the conductor, wherein the conductor is electrically coupled to intelligent antenna controller, and wherein intelligent antenna controller is further configured to receive the processed, transmitted signal from the second intelligent antenna and further process the processed, transmitted signal, wherein the intelligent antenna controller is further configured to provide power for the operation of the second intelligent antenna to the second intelligent antenna via the conductor of conductor over which the processed, transmitted signal from the second intelligent antenna is communicated, and wherein the intelligent antenna controller is further configured to communicate data to the second intelligent antenna via the conductor of conductor over which the processed, transmitted signal and power are communicated to the second intelligent antenna.

5. An Intelligent Antenna System as claimed in claim 1 wherein the first intelligent antenna is further configured to communicate data to the intelligent antenna controller via the conductor of conductor over which the processed, transmitted signal and power are communicated.

6. An Intelligent Antenna System as claimed in claim 5 wherein the intelligent antenna controller is further configured to interpret data communicated to the intelligent antenna controller by first intelligent antenna via the conductor of conductor over which the data is communicated.

7. An Intelligent Antenna System as claimed in claim 6 wherein the intelligent antenna controller is further configured to alter its operation responsive to the interpreted data communicated by the first intelligent antenna.

8. An Intelligent Antenna System as claimed in claim 1 wherein the intelligent antenna controller further comprises circuitry configured to alter a voltage component of the power provided by intelligent antenna controller to the first intelligent antenna between multiple discrete voltage levels between a maximum allowable operating voltage level of the first intelligent antenna and a minimum required operating voltage level of the first intelligent antenna, and wherein the data communicated to the first intelligent antenna by the intelligent antenna controller is created by altering the voltage provided to the first intelligent antenna by the intelligent antenna controller among the multiple voltage levels in a systematic pattern.

9. An Intelligent Antenna System as claimed in claim 8 wherein the first intelligent antenna further comprises circuitry configured to monitor a voltage component of the power provided by intelligent antenna controller to the first intelligent antenna to detect multiple discrete voltage levels, and to interpret the pattern of changes among multiple discrete voltage levels to extract data communicated to the first intelligent antenna by intelligent antenna controller.

10. An Intelligent Antenna System as claimed in claim 9 wherein the first intelligent antenna is further configured to alter its operation responsive to the interpreted data communicated by the intelligent antenna controller.

11. An Intelligent Antenna System as claimed in claim 8 wherein the first intelligent antenna further comprises circuitry configured to alter the current consumed by the first intelligent antenna over conductor between multiple discrete current consumption levels between a maximum current consumption level and a minimum current consumption level of the first intelligent antenna, and wherein the first intelligent antenna is further configured to communicate data to the intelligent antenna controller via the conductor of conductor over which the processed, transmitted signal and power are communicated, wherein the data communicated to the intelligent antenna controller by the first intelligent antenna is created by altering the current consumed via conductor by the first intelligent antenna between the multiple current consumption levels in a systematic pattern.

12. An Intelligent Antenna System as claimed in claim 11 wherein the intelligent antenna controller further comprises circuitry configured to monitor the current consumption of the first intelligent antenna via conductor to detect multiple discrete current consumption levels, and to interpret the pattern of changes among multiple discrete current consumption levels to extract data communicated to intelligent antenna controller by the first intelligent antenna.

13. An Intelligent Antenna System as claimed in claim 12 wherein the intelligent antenna controller is further configured to alter its operation responsive to the interpreted data communicated by the first intelligent antenna.

14. An Intelligent Antenna System as claimed in claim 13, wherein conductor is an RF coaxial cable having a single central electrically-conducting wire surrounded by an insulator that is surrounded by shielding and a sheath, wherein the processed, transmitted signal, power, and communicated data are simultaneously provided between intelligent antenna controller and intelligent antenna via the single central electrically-conducting wire of the RF coaxial cable.

15. An Intelligent Antenna System comprising:
  a first antenna conductor configured to intercept a transmitted signal and conduct at least a portion of the transmitted signal into the first antenna conductor;
  a conductor comprising the conductor electrically coupled to the first antenna conductor and configured to communicate the transmitted signal along the conductor to other devices electrically coupled to the conductor;
  a first intelligent antenna electrically coupled to the conductor and configured to receive the transmitted signal via the conductor, process the transmitted signal to alter at least one characteristic of the signal, and provide the processed; transmitted signal external to the first intelligent antenna;
  a conductor comprising a conductor electrically coupled to the first intelligent antenna and configured to communicate the processed; transmitted signal along the conductor to other devices electrically coupled to the conductor; and,
  an intelligent antenna controller electrically coupled to the conductor and comprising a voltage regulator having an output electrically coupled to the conductor and an input electrically coupled to a processor via a switch, wherein the intelligent antenna controller is configured to receive the processed transmitted signal via conductor and further process the processed, transmitted signal, and wherein the intelligent antenna controller is further configured to provide voltage for operation of the first intelligent antenna to the first intelligent antenna from an output of the voltage regulator via the conductor of conductor over which the processed transmitted signal is communicated, and wherein the intelligent antenna controller is still further configured to communicate data to the first intelligent antenna via the conductor of conductor over which the processed; transmitted signal and power are communicated by systematically altering the voltage provided from the output of the voltage regulator among multiple discrete voltage levels by means of the switch, wherein the switch state changes responsive to the processor.

16. An Intelligent Antenna System as claimed in claim 15, wherein the first intelligent antenna comprises:
  voltage detect circuitry electrically coupled to the conductor; and
  a processor electrically coupled to the voltage detect circuitry, wherein the voltage detect circuitry is configured to detect the voltage provided by intelligent antenna controller, scale the voltage to levels compatible with the processor, and provide the scaled voltage to the processor, and wherein the processor is configured to detect multiple discrete voltage levels, and to interpret the pattern of changes among multiple discrete voltage levels to extract data communicated to the first intelligent antenna by intelligent antenna controller.

17. An Intelligent Antenna System as claimed in claim 16, wherein the first intelligent antenna further comprises:
  a switch electrically coupled to the processor; and,
  filters electrically coupled to the switch and configured to filter the processed, transmitted signal, wherein the processor of the first intelligent antenna is configured to alter the state of the switch to select among the multiple filters responsive to the extracted data communicated by intelligent antenna controller.

18. An Intelligent Antenna System as claimed in claim 17, wherein the first intelligent antenna further comprises:
  a current sink electrically coupled to the processor and conductor, wherein the current sink is configured, responsive to the processor, to communicate data to intelligent antenna controller via conductor by systematically altering the current consumed by first intelligent antenna via conductor among multiple discrete current consumption levels.

19. An Intelligent Antenna System as claimed in claim 18, wherein the intelligent antenna controller further comprises:
  a current sense amplifier electrically coupled to the processor and conductor, wherein the current sense amplifier is configured to detect the current consumed by intelligent antenna, convert the detected consumed current to a voltage value corresponding to the magnitude of current consumed, and provide the voltage value corresponding to the magnitude of current consumed to the processor, and wherein the process is configured to evaluate the voltage value corresponding to the magnitude of current consumed by intelligent antenna, and extract data communicated by intelligent antenna to intelligent antenna controller based on the pattern of systematic alteration among multiple discrete current consumption levels of intelligent antenna.

20. A method of communicating data between an intelligent antenna controller and antenna electrically coupled thereto, the antenna being electrically coupled to an antenna conductor, comprising:

generating a regulated voltage in a voltage regulator of an intelligent antenna controller;

providing the regulated voltage, via a single conductor cable, to the antenna having electronic circuitry therein to power the electronic circuitry;

generating control signals corresponding to a message to be sent containing data to be provided to the antenna in processing circuitry of the intelligent antenna controller;

providing the control signals corresponding to the message to the voltage regulator of the intelligent antenna controller;

altering a provided regulated voltage among multiple levels in a systematic pattern responsive to the control signals to transmit the message to the antenna; monitoring a voltage provided by the intelligent antenna controller via the single conductor cable in the electronic circuitry of the antenna to interpret the transmitted message; and, performing a step in the electronic circuitry of the antenna responsive to the interpreted message, wherein a signal received by an antenna conductor of the antenna is simultaneously provided during the provision of power and transmission of the message by the intelligent antenna controller to the antenna, to the antenna power supply by the via the single conductor cable.

\* \* \* \* \*